(12) United States Patent
Layton et al.

(10) Patent No.: US 10,389,755 B2
(45) Date of Patent: *Aug. 20, 2019

(54) DISTRIBUTED SECURE CONTENT DELIVERY

(71) Applicant: Apple Inc., Cupertino, CA (US)

(72) Inventors: Eric Christopher Layton, Mapleton, UT (US); Luke Terry Hallett, Santaquin, UT (US); Thomas Dean Maynard, Riverton, UT (US); Matthew Frank Magleby, Springville, UT (US)

(73) Assignee: Apple Inc., Cupertino, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 14/959,196

(22) Filed: Dec. 4, 2015

(65) Prior Publication Data

US 2016/0191569 A1 Jun. 30, 2016

Related U.S. Application Data

(62) Division of application No. 14/285,394, filed on May 22, 2014, now Pat. No. 9,208,342, which is a division
(Continued)

(51) Int. Cl.
| | |
|---|---|
| *H04L 29/06* | (2006.01) |
| *G06F 21/10* | (2013.01) |
| *G06F 21/33* | (2013.01) |
| *G06F 21/31* | (2013.01) |
| *G06F 21/62* | (2013.01) |

(52) U.S. Cl.
CPC .............. *H04L 63/20* (2013.01); *G06F 21/10* (2013.01); *G06F 21/105* (2013.01); *G06F 21/31* (2013.01); *G06F 21/33* (2013.01); *G06F 21/6218* (2013.01); *H04L 63/0281* (2013.01); *H04L 63/0823* (2013.01); *H04L 63/10* (2013.01); *H04L 63/101* (2013.01)

(58) Field of Classification Search
CPC ............... G06F 21/105; G06F 21/6218; H04L 63/0281; H04L 63/0823
USPC ............. 726/1, 4, 22, 26; 713/167, 182, 189
See application file for complete search history.

(56) References Cited

U.S. PATENT DOCUMENTS

| | | |
|---|---|---|
| 6,910,064 B1 | 6/2005 | Astarabadi et al. |
| 6,993,508 B1 | 1/2006 | Major et al. |
| | (Continued) | |

OTHER PUBLICATIONS

"CA eTrust SiteMinder Policy Server"—Policy Design r6.0 Service Pack 5, CA, Dec. 10, 2004 https://support.ca.com/cadocs/0/h004862e.pdf.*

(Continued)

*Primary Examiner* — Randy A Scott
(74) *Attorney, Agent, or Firm* — Womble Bond Dickinson (US) LLP

(57) ABSTRACT

Techniques for distributed and secure content delivery are provided. Requests for content are routed to a centralized service where the requestors are authenticated for access to the content. The centralized service generates access statements for the requestors. The requestors are redirected to particular distributed content services having access to the desired content. The distributed content services verify the access statements and vend the desired content to the requestors.

32 Claims, 3 Drawing Sheets

Related U.S. Application Data of application No. 11/448,427, filed on Jun. 7, 2006, now Pat. No. 8,745,227.

(56) References Cited

U.S. PATENT DOCUMENTS

| | | | |
|---|---|---|---|
| 7,010,578 | B1 | 3/2006 | Lewin |
| 7,017,188 | B1 | 3/2006 | Schmeidler et al. |
| 7,054,935 | B2 | 5/2006 | Farber et al. |
| 7,590,630 | B2* | 9/2009 | Richter ............... G06F 21/604 |
| 7,793,342 | B1* | 9/2010 | Ebrahimi ............ H04L 63/0281 713/166 |
| 7,818,435 | B1 | 10/2010 | Jellinek |
| 8,015,301 | B2* | 9/2011 | Carter ................. H04L 63/102 709/229 |
| 8,307,406 | B1 | 11/2012 | Aboujaoude et al. |
| 2002/0026511 | A1 | 2/2002 | Garcia-Luna-Aceves et al. |
| 2002/0091763 | A1 | 7/2002 | Shah et al. |
| 2003/0154217 | A1* | 8/2003 | Kinno ............... G06F 17/30817 |
| 2004/0015596 | A1 | 1/2004 | Sapuram et al. |
| 2005/0021969 | A1* | 1/2005 | Williams ............. H04L 9/3268 713/176 |
| 2005/0068983 | A1* | 3/2005 | Carter ................. H04L 63/102 370/480 |
| 2005/0131901 | A1 | 6/2005 | Richter |
| 2005/0198359 | A1 | 9/2005 | Basani et al. |
| 2005/0289145 | A1 | 12/2005 | Voegel |
| 2006/0064494 | A1 | 3/2006 | Fukui |
| 2006/0156392 | A1 | 7/2006 | Baugher |
| 2006/0190997 | A1* | 8/2006 | Mahajani ............ H04L 63/0227 726/10 |
| 2007/0061263 | A1* | 3/2007 | Carter ................ H04L 63/0421 705/51 |
| 2007/0233957 | A1 | 10/2007 | Lev-Ran et al. |
| 2007/0261100 | A1 | 11/2007 | Greeson et al. |
| 2007/0283424 | A1 | 12/2007 | Kinser et al. |
| 2008/0127320 | A1 | 5/2008 | De Lutiis et al. |

OTHER PUBLICATIONS http://www.ca.com/us/~/media/files/solutionbriefs/ca_cmdb_solution_brief.aspx "CA CMDB"—May 2006 www.ca.com.

https://www.oasis-open.org/committees/download.php/12958/SAMLV2.0-basics.pdf "SAML V2.0 Basics"—Eve Maler Sun Microsystems, May 2005.

"Identity Federation: Concepts, Use Cases and Industry Standards", *CA White Paper*, http://www3.ca.com/Files/WhitePapers/Indentity_federation_white_paper.pdf, (Dec. 2005), 1-25.

"Universal Federation Architecture: eTrust SiteMinder and eTrust TransactionMinder Solutions", *CA White Paper*, http://www3.ca.com/Files/WhitePapers/universal_federation_arch_wp.pdf, (Apr. 2006), 1-23.

"Authentication Using Graphical Passwords: Effects of Tolerance and Image Choice"—Wiedenbeck et al., CMU, Apr. 2005 https://cups.cs.cmu.edu/soups/2005/2005proceedings/p1-wiedenbeck.pdf.

"European Search Report for Application No. EP 06 11 0238", 14 pages.

"Terminology & Glossary", *The Workflow Management Coalition Specification*, Doc. No. WFMC-TC-1011, Issue 3.0, (Feb. 1999), 1-65.

"Workflow Security Considerations—White Paper", *The Workflow Management Coalition Specification*, Doc. No. WFMC-TC-1019, Issue 1.0, (Feb. 1998), 1-15.

"Workflow Standard—Interoperability Abstract Specification", *The Workflow Management Coalition Specification*, Doc. No. WFMC-TC-1012, (Nov. 30, 1999), 1-44.

Au, Richard, et al., "Automated Cross-organisational Trust Establishment on Extranets", *Information Technology for Virtual Enterprises*, (Jan. 29, 2001), 3-11.

Hollingsworth, D., "Workflow Management Coalition, The Workflow Reference Model", Document No. TC00-1003, (Jan. 19, 1995), pp. 1-55.

Kaijser, Per, et al., "SESAME: The solution to security for open distributed systems", *III: Security Applications, Butterworth-Heinemann Ltd. Computer communications*, vol. 17, No. 7, (Jul. 1994), 501-518.

Lopez, J., et al., "Authentication and authorization infrastructures (AAI's): a comparative survey", *Computers & Security*, vol. 23, No. 7, (Oct. 2004), 578-590.

Neuman, Clifford et al., "Kerberos: An Authentication Service for Computer Networks", *IEEE Communication Magazine 32*, No. 9, (Sep. 1994), 6 pages.

Schulz, Karsten A., et al., "Facilitating cross-organisational workflows with a workflow view approach", *Data & Knowledge Engineering*, vol. 51, (2004), 109-147.

* cited by examiner

DISTRIBUTED SECURE CONTENT DELIVERY

This application is a divisional of co-pending U.S. application Ser. No. 14/285,394 filed on May 22, 2014, which is a divisional of U.S. application Ser. No. 11/448,427 filed on Jun. 7, 2006, now issued as U.S. Pat. No. 8,745,227.

FIELD

The invention relates generally to content delivery and more particularly to techniques for delivering content in a distributed and secure fashion.

BACKGROUND

Increasingly, secure, private, or licensed content is being distributed over the Internet. Individuals, enterprises, and governments are supplying and acquiring content via the Internet. With these exploding phenomena, there is a variety of challenges presented to the content provider.

For instance, the content provider may not be particularly adept at authenticating users for access to its content. Consequently, the content provider may want to offload the authentication and/or licensing enforcement to one or more third-party services. For that matter, the content provider may even want to offload content delivery to a third-party, since the content provider may not be skilled at streaming content or may not have the necessary resources, such as bandwidth capabilities, for properly vending the content to its users.

It is particularly difficult for a single service provider to perform all services well, which may be associated with secure content delivery. That is, a service provider may provide good authentication and licensing enforcement but the same service provider may not perform well at or have the resources to perform well at content delivery.

Moreover, if authentication and/or license enforcement are offloaded then the content delivery often has to be integrated with or interfaced to the service that provides the authentication and/or license enforcement. This means that features associated with content delivery are often tightly coupled and integrated with features associated with authentication and/or license enforcement. So, if one changes then the other has to be modified as well to reflect the changes. This creates challenges for maintenance and support.

To streamline the authentication, a content provider may forgo customized identity based access by setting up sites that are geared towards groups of users having the same access rights or licensing rights to content. Yet, this is not acceptable because what often ends up occurring is the content provider ends up managing a plethora of sites for the same content, where each site has its own access rights to satisfy varying customer demands.

So, in general content providers either end up with complicated delivery services or redundant and disparate delivery services for the same content being delivered.

Therefore, it is advantageous to provide techniques for more secure and distributed content delivery that is more manageable and less complicated.

SUMMARY

In various embodiments, techniques for distributed and secure content delivery over a network are provided. More specifically, and in an embodiment, a method for vending content to a principal over a network is provided. A request for content is received from a principal and the principal is authenticated for access to that content. Next, an access statement is generated for the principal for purposes of acquiring the content from a service, which distributes the content. Finally, the principal is redirected to the service for purposes of acquiring the content.

DETAILED DESCRIPTION

Figure 1:
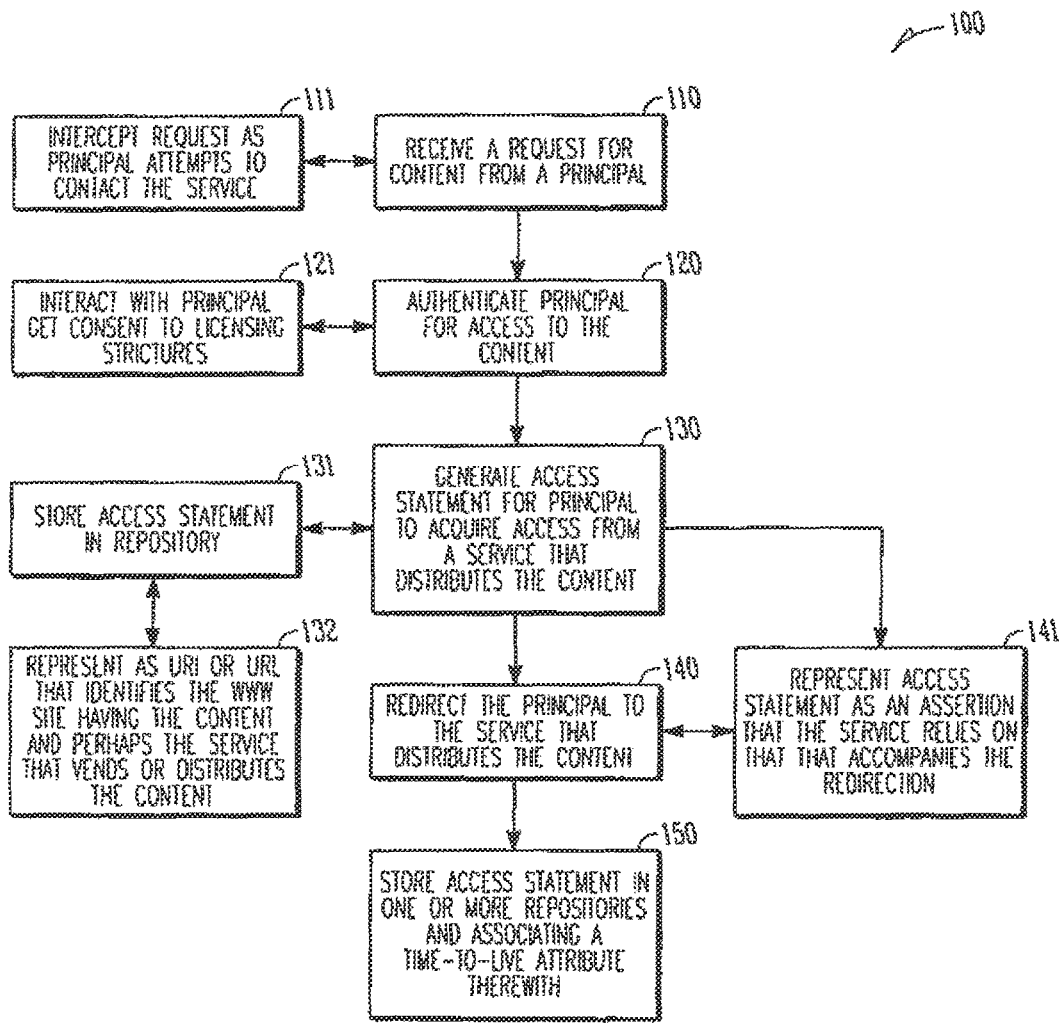
FIG. 1 is a diagram of a method for vending content to a principal, according to an example embodiment.

As used herein a "service" is a type of resource that is accessible over a network. The service is implemented as instructions that when loaded and accessed by a machine performs one or more functions that the service is advertised to perform. A "principal" is another type of resource that may be an automated service, or may logically represent a physical resource within an electronic environment, such as, but not limited to, a user, a device, a group of users, a group of devices, an object, etc.

An "identity service" refers to a special type of service that is designed to manage and supply authentication services and authentication information for principals and for other services. So, an identity service may authenticate a given principal for access to a variety of local and external services being managed by that identity service. A single principal may have multiple identity services.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein. In some cases, these identity services may be enhanced to include some features and techniques discussed in greater detail herein and below.

An identity service may also provide single sign-on services to a principal. That is, a principal may sign-on to an identity service and acquire identities and credentials to access a variety of other services.

A principal is recognized via an "identity." An identity is authenticated via various techniques (e.g., challenge and response interaction, cookies, assertions, etc.) that use various identifying information (e.g., identifiers with passwords, biometric data, digital certificates, digital signatures, etc.). A "true identity" is one that is unique to a principal across any context that the principal may engage in over a network (e.g., Internet, Intranet, etc.). However, each principal may have and manage a variety of identities, where each of these identities may only be unique within a given context (given service interaction).

As used herein "attributes" may be viewed as types of identifying information, such as, but not limited to, birth date, mother's maiden name, pet's name, last transaction for a given context, age, employment, income level, social-security number (SSN), etc.

The true identity of a principal is typically managed and controlled by an identity service, such as the ones enumerated above. The identity service may also manage the principal's other identities that the principal uses with services for which the principal interacts in a variety of different contexts.

An "access statement" is information that a content vending service uses to determine if access to content is permissible. The statement may be represented in a variety of formats. For example, in some cases the statement may be a flag. In other cases, the statement may be a Uniform Resource Identifier (URI) or Uniform Resource Locator (URL). The URI or URL may identify a particular World-Wide Web (WWW) site that has desired content, which is to be vended to a requesting principal. In still other situations, the statement may be an assertion from a trusted principal, such as an identity service. The assertion may be in a Security Assertion Markup Language (SAML), a Liberty Alliance Group format, etc.

Content may itself be viewed as a type of resource. It can include documents, videos, images, software, graphics, audio, or various combinations of these things. Content is vended to principals in a distributed and secure manner via a centralized service that creates access statements and via distributed services that validate the access statements and vend the content to the principals. The techniques and variations on achieving this are discussed in greater detail below with reference to the FIGS.

Various embodiments of this invention can be implemented in existing network architectures. In some cases, the techniques presented herein may be implemented as enhancements to existing services. These enhancements may be integrated into the existing services or accessed externally via Application Programming Interfaces (API's). In some cases, the enhancements may be unknown to the existing services, such that the existing services are not even aware of the techniques being processed. This can occur when the techniques are implemented as a transparent proxy or a reverse proxy on behalf of the services. According to the techniques presented herein are implemented in whole or in part in the Novell® network products, proxy server products, email products, identity service products, operating system products, and/or directory services products distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

FIG. 1 is a diagram of a method 100 for vending content to a principal, according to an example embodiment. The method 100 (hereinafter "centralized content delivery service") is implemented in a machine-accessible and readable medium. The centralized content delivery service is operational over and processes within a network. The network may be wired, wireless, or a combination of wired and wireless.

Initially, a principal attempts to acquire desired content over the network. According to an embodiment, the principal uses a WWW browser and its interface to activate an URI or URL that is associated with the desired content. The processing of the centralized content delivery service may be indirectly invoked when this URI or URL is activated. Thus, the processing of the centralized content delivery service may be viewed as a transparent proxy associated with the principal that intercepts external network access attempts made by the principal. Alternatively, the processing of the centralized content delivery service may be viewed as a reverse proxy associated with a content provider or content distributor associated with the desired content that processes content requests before content is vended to requesting principals. It is noted that the centralized content delivery service may also be a forward proxy that the principal directly interacts with or is configured to interact with. In fact, the centralized content delivery service does not have to be a proxy at all and may be directly accessed by the URI or URL activated by the principal. In this manner, the centralized content delivery service may be viewed as front-end or initial content delivery service that is activated in a variety of manners when a principal requests desired content that is being controlled or managed by the centralized content delivery service.

At 110, the centralized content delivery service receives a request for desired content from a requesting principal. Again, in some cases this request may be an activated URI or URL from within a browser page or manually entered into a browser by the principal. The request is either directly sent to the centralized content delivery service or is indirectly sent via some interception mechanism, as discussed above and depicted at 111.

At 120, the centralized content delivery service authenticates the principal for access to the content. That is, credentials of the principal are verified according to policy for purposes of determining that the principal's identity is whom it purports to be. Any authentication mechanism may be used, such as, but not limited to, passwords, biometrics, certificates, signatures, combinations of these, and the like.

According to an embodiment, the authentication of the principal may be offloaded to an identity service. In other cases, the processing associated with the centralized content delivery service may be subsumed as enhancements into an identity service. In still other cases, the authentication is entirely handled within the centralized content delivery service with no interaction with an identity service.

In some embodiments, at 121, the centralized content delivery service may also engage and interact with the principal for purposes of getting consent to licensing or legal strictures related to accessing and using the desired content. So, the principal may have to read a license or export agreement and consent to the terms associated therewith.

At 130, the centralized content delivery service generates an access statement for the principal to acquire the content from a content distribution service that directly vends the content. The access statement is subsequently consumed by the content distribution service to verify that the principal is to be given access to the desired content. The access statement serves as a mechanism by which the content distribution service can perform a second check to ensure that the principal is authorized to receive and access the desired content. The content distribution service does not have to be directly configured to interact with the centralized content delivery service for purposes of making this additional check; rather the access statement produced by the centralized content delivery service may be acquired and verified by the content distribution service in a variety of manners in an indirect fashion. This decouples the content distribution service from the centralized content delivery service while still maintaining communication via the access statement.

According to an embodiment, at 131, the centralized content delivery service may store the access statement in a repository. The repository is also accessible to the content distribution service. The access statement may be indexed in the repository according to an identifier or identity associated with the principal.

In an embodiment, at 132, the access statement may be represented as an URI or URL that identifies the WWW site or the content distribution service that vends or distributes the desired content to the principal directly. Thus, the content distribution service when it receives a direct request for content from the principal inspects the repository in response to an identifier for the principal and acquires the URI or URL (access statement) against another URI or URL that the principal supplies for specific content. If the two URI's or URL's match the content distribution service has successfully verified the principal for access to the desired content and that content may then be streamed or vended to the principal from the content distribution service.

At 140, the centralized content delivery service redirects the principal to the content distribution service that directly distributes or vends the desired content being requested by the principal.

According to an embodiment, this redirection may occur automatically and in near real time, such that the principal is not aware of the redirection. That is, the principal may be interacting via a browser and the initial contact to the centralized content delivery service may appear to the principal to be an interaction directly with the content distribution service (such as when the centralized content delivery service is a transparent or reverse proxy); the centralized content delivery service authenticates the principal, generates the access statement, and redirects the browser of the principal directly to the content distribution service. All this interaction may be transparent to the principal and may appear to occur in a nearly instantaneous fashion.

In some cases, at 141, the access statement that was generated by the centralized content delivery service on behalf of the principal may have been represented as an assertion from the centralized content delivery service and may be accompanied with the redirected request that the principal makes to the content distribution service. The assertion may be a SAML or Liberty Alliance Group assertion that informs the content distribution service that the centralized content delivery service is vouching for the principal and that correspondingly access to the desired content is authorized and appropriate. In this manner, the access statement may be an assertion that accompanies a redirected request of the principal, which the content distribution service relies on and uses to provide the principal access to the content.

In some embodiments, at 150, the access statement may be stored in one or more repositories and include other attributes, such as a time-to-live attribute, where the access statement becomes stale or is removed from the repository upon occurrence of an event, such as, but not limited to, an elapsed period of time from when the access statement was initially stored in the repository. So, there may be redundant sites having the desired content, with each site processing an instance of the content distribution service and each site potentially having access to a specific repository. The centralized content delivery service may replicate the access statement to each such repository to ensure each instance of the content distribution service can acquire the access statement for purposes of performing its own independent verification on a requested principal's access attempt for desired content. Each repository may include attributes from the access statement and policy associated with the attributes may be enforced by each instance of the content distribution service.

In another variation to the processing associated with the centralized content delivery service, the principal may authenticate to an identity service via the centralized content delivery service and obtain a crafted identity or different and perhaps temporary identity. That crafted identity may then be used to access the content from the content distribution service.

Figure 2:
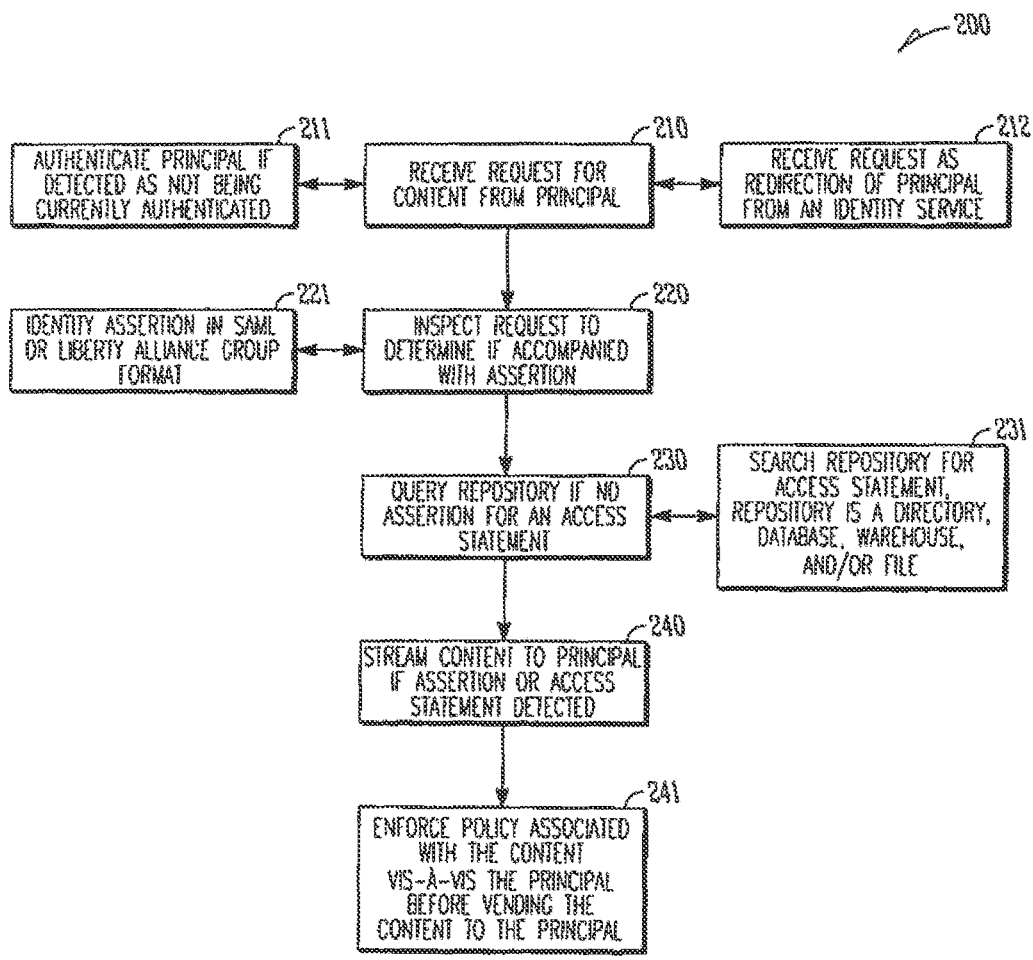
FIG. 2 is a diagram of another method for vending content to a principal, according to an example embodiment.

FIG. 2 is a diagram of another method 200 for vending content to a principal, according to an example embodiment. The method 200 (hereinafter "distributed content delivery service" is implemented in a machine-accessible and readable medium and is operational over a network. The network may be wired, wireless, or a combination of wired and wireless. The distributed content delivery service indirectly interacts with the centralized content delivery service represented by the method 100 of the FIG. 1. According to an embodiment, the distributed content delivery service either indirectly receives information from the centralized content delivery service via redirected interactions from a principal or indirectly acquires information from the centralized content delivery service via a commonly accessible repository.

The distributed content delivery service represents more detailed processing associated with the content distribution service that was discussed above with respect to the centralized content delivery service represented by the method 100 of the FIG. 1. Thus, a plurality of independent distributed content delivery service may be processing at any given instant over the network and each independent instance is capable of acquiring access statements initially generated by the distributed content delivery service for purposes of independently verifying access attempts to content being made by requesting principals. It is noted that each independent instance of the distributed content delivery service does not have to directly interface to or interact with the centralized content delivery service; rather the access statements may be used to achieve indirect interaction.

At 210, the distributed content delivery service receives a request for content from a requesting principal. At 211, the principal may be independently authenticated by the distributed content delivery service if the principal is detected as not being already authenticated. That is, the principal may have previously interacted with the centralized content delivery service where the principal was properly authenticated; but the principal may have ended a session or waited for an extended period of time before contacting the distributed content delivery service for the desired content. In such a situation, the distributed content delivery service may according to policy re-authenticate the principal to its satisfaction. In some cases, the authentication may be offloaded to an identity service or may be independently performed by the distributed content delivery service.

At 212, the request may have been received by the distributed content delivery service from the principal as a redirection from an identity service or a centralized content delivery service (such as the one represented by the method 100 of the FIG. 1). So, the principal was initially interacting with the identity service of the centralized content delivery service and was redirected to the distributed content delivery service for purposes of acquiring the desired content directly from the distributed content delivery service.

At 220, the distributed content delivery service inspects the request to determine if the request is accompanied by an assertion from the identity service or the centralized content delivery service. In some cases, at 221, the assertion may be in a SAML or Liberty Alliance Group format and may represent an indication from the identity service or the centralized content delivery service that the principal is authenticated for access to the desired content being requested. The assertion may indicate that no additional processing is needed to provide access to the principal or may indicate that the distributed content delivery service should perform an additional validation according to policy.

At 230 and in cases where an assertion is not being relied upon solely for access, the distributed content delivery service queries a repository to determine if an access statement for the content is associated with the requesting principal. At 231, the distributed content delivery service may search the repository for the access statement using an identifier or identity associated with the principal as a search term. The repository may be viewed as a directory, a database, a data warehouse, a file, etc. The repository is indexed based on the identity of the requesting principal.

In some cases, the repository may house and be named for a single principal, such that the repository itself is resolved and acquired based on the identity of the principal. So, the repository may include a variety of access statements for a variety of disparate principals or it may be geared toward a specific principal. The recorded access statements may also include attributes associated with policy that the distributed content delivery service enforces, such that even if a valid access statement is located in the repository for the principal it may still be stale or invalid based on attributes and/or policy that are dynamically evaluated in real time.

At 240, the distributed content delivery service streams or vends the content requested by the principal if an assertion indicates that the principal is authorized or if a valid access statement is detected. According to an embodiment, at 241, the distributed content delivery service may also enforce policy associated with vending the content vis-à-vis the principal and the content. So, a policy associated with the content, or the principal, or both the content and the principal may be enforced during distribution of the content to the principal. For example, some policy may restrict bandwidth during the streaming of the content to the principal. Another policy may limit features that are enabled within the content, which the distributed content delivery service configures by setting parameters associated with the content delivery. In fact, a variety of desired policies may be dynamically enforced in real time when the content is stream and vended to the principal from the distributed content delivery service.

According to an embodiment, the distributed content delivery service acquires an access statement from a repository that is named after an identity or identifier uniquely associated with the requesting principal. The request also includes a version of the access statement and the distributed content delivery service compares the access statement of the request against the acquired access statement from the repository. If the two versions match, then the distributed content delivery service can be satisfied that an independent and secondary validation has been achieved before the principal is vended or streamed the desired content.

It is also noted, that if the principal is not authenticated or does not have a proper assertion or a proper access statement, then the principal is denied access to the desired content. If such a situation occurs, the distributed content delivery service may log the event and may optional report it to a different principal.

Figure 3:
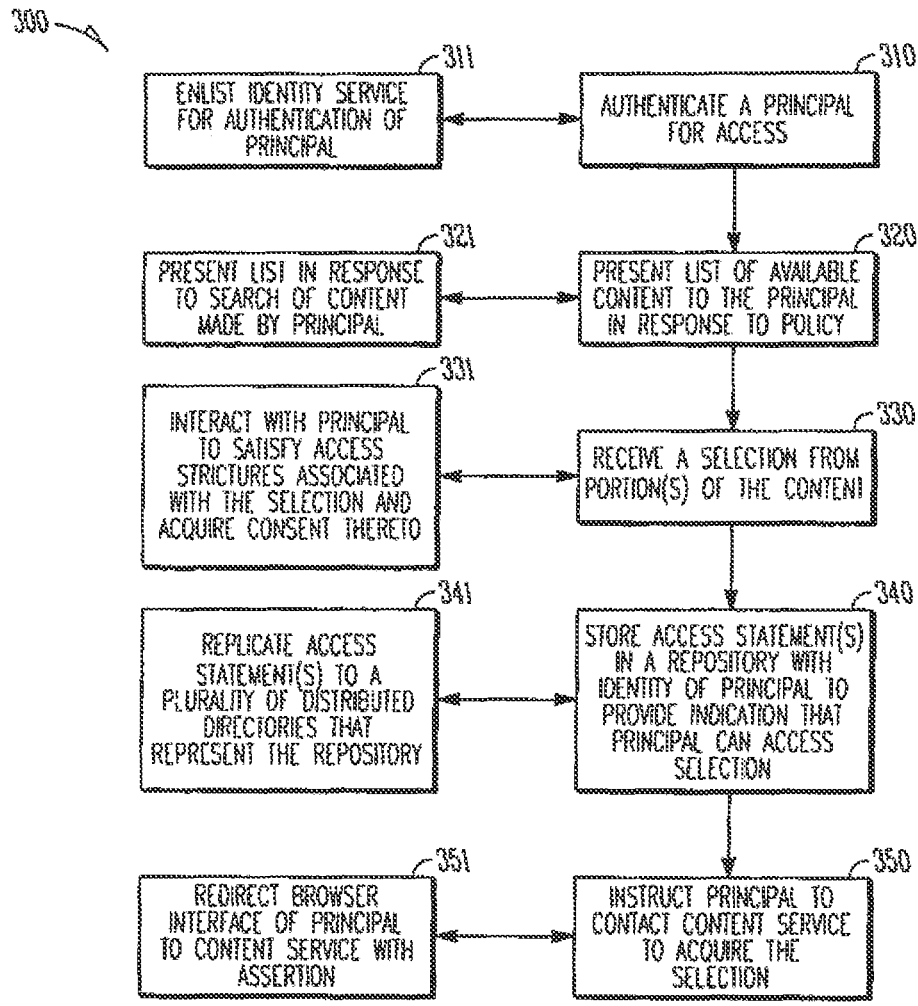
FIG. 3 is a diagram of a yet another method for vending content to a principal, according to an example embodiment.

FIG. 3 is a diagram of a yet another method 300 for vending content to a principal, according to an example embodiment. The method 300 (hereinafter "content vending service") is implemented in a machine-accessible and readable medium and is accessible over a network. The network may be wired, wireless, or a combination of wired and wireless. The content vending service represents an alternative processing perspective to the centralized content delivery service represented by the method 100 of the FIG. 1; thus, the content vending service also indirectly interacts with the distributed content delivery service represented by the method 200 of the FIG. 2.

At 310, the content vending service authenticates a requesting principal for access. Authentication techniques and identifiers or identifying information associated with the principal that is used with the techniques may be resolved and processed according to policy. In some cases, at 311, an identity service may be enlisted to perform the authentication of the principal.

At 320, the content vending service presents a list of available content to the principal in response to policy. So, once the principal is authenticated a different policy associated with the principal may dictate what content is available for this particular principal to access. According to an embodiment, at 321, the list of available content may also be generated in response to a search of the content performed by the principal against a corpus of content. The list may then represent an answer set of the search that the content vending service performs on behalf of the principal.

At 330, the content vending service receives a specific selection from portions of the available content identified in the list. The selection represents desired content that the principal seeks to gain access to. In some cases, at 331, the content vending service may then engage the principal to satisfy access strictures associated with the selection for purposes of acquiring principal consent or assent to the access strictures. This may be related to licensing strictures or to legal strictures, such as governmental regulations with respect to export controls.

At 340, the content vending service stores one or more access statements in a repository. The access statements are associated with the identity of the principal within the repository. This may be done by naming the repository itself with a unique identifier associated with the specific requesting principal or may be done by using a more generic repository that includes indexed records keyed on unique identifiers associated with unique requesting principals. The access statement provides a mechanism by which a subsequent content service can independently verify that the principal is authorized to access the selection associated with the content. The content service may not directly interact or interface with the content vending service; but the content service does have access to the repository for purposes of acquiring the access statement that the content vending service stored there.

In some embodiments, at 341, the content vending service may actually replicate the access statements to a plurality of distributed directories, each distributed directory representing a different duplicated instance of the repository. Alternatively, the distributed directories as a whole may represent a single logical repository.

At 350, the content vending service instructs the principal to content the content service for purposes of directly acquiring the selection of the content. As was mentioned above and again at 351, the instruction may be achieved via a redirected browser interface interaction associated with the principal, where the browser of the principal is redirected from the content vending service to the content service once the content vending service has authenticated the principal for access to the selection and generated and stored the access statement(s) in the repository.

At this point the interaction between the principal and the content service may proceed in a manner similar to what was discussed above with respect to the distributed content delivery service represented by the method 200 of the FIG. 2. During this interaction with the content service, the principal is directly vended the selection of the content, assuming the content service can independently assure itself that the principal is authenticated and that the principal's request for the selection matches the access statement in the repository.

Figure 4:
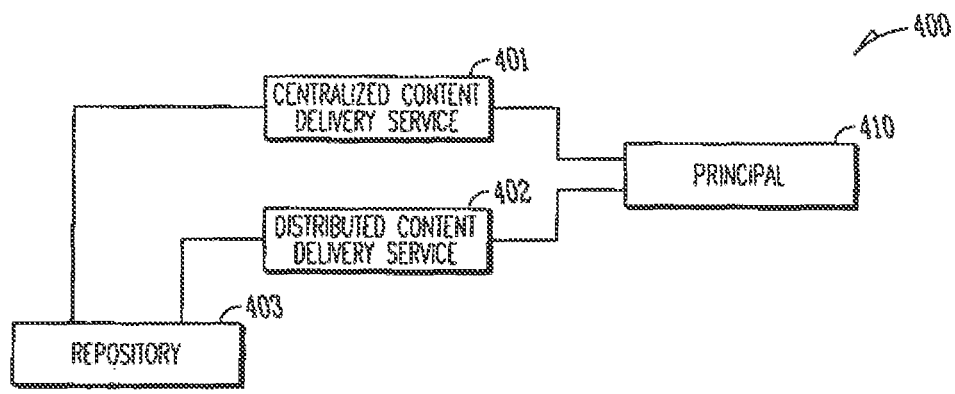
FIG. 4 is a diagram of a content vending system, according to an example embodiment.

FIG. 4 is a diagram of a content vending system 400, according to an example embodiment. The content vending system 400 is implemented in a machine-accessible and readable medium and is accessible over a network. The network may be wired, wireless, or a combination of wired and wireless. The processing of the content vending system 400 implements, among other things, the processing of methods 100, 200, and/or 300 depicted in the FIGS. 1-3, respectively.

The content vending system 400 includes a centralized content delivery service 401 and a distributed content delivery service 402. In some cases, the content vending system 400 may also include a repository 403. The components of the content vending system 400 interact with a requesting principal 410 for purposes of vending or streaming requested content to the principal 410. Each of these components and their interactions with one another will now be discussed in greater detail.

The centralized content delivery service 401 performs the functions and services discussed above with respect to the methods 100 and 300 of the FIGS. 1 and 3, respectively. In some embodiments, the processing of the centralized content delivery service 401 is subsumed into an identity service and represents enhanced processing associated with an identity service. Examples or some types of identity service where these enhancements may be implemented were incorporated by reference above.

The centralized content delivery service 401 initially interacts with a requesting principal 410. The principal 410 desires specific content that is controlled by the distributed content delivery service 402. The centralized content delivery service 401 may receive a direct communication from the principal 410 or may indirectly receive the communication by intercepting that communication before it is capable of being processed by the distributed content delivery service 402.

The centralized content delivery service 401 authenticates the principal 410 for access to the desired content. In some cases, the centralized content delivery service may enlist the services of an identity service to perform this authentication. The centralized content delivery service 401 also generates an access statement for the requested access to the content. In some cases, the access statement may be represented as an assertion from the centralized content delivery service 401, which the distributed content delivery service may rely upon to grant direct access to the content. In other cases, the access statement is stored in a repository 403.

The repository 403 is used for recording access statements generated by the centralized content delivery service 401. The repository uniquely identifies specific access statements with specific principals 410. The repository 403 is read and accessed by the distributed content delivery service 402 and serves as an interface mechanism between the centralized content delivery service 401 and the distributed content delivery service 402.

According to an embodiment, entries for each access statement within the repository 403 may also include a variety of attributes. For example, an attribute may indicate a time-to-live for any given access statement, such that when an elapsed period of time is detected the access statement associated with the time-to-live attributed becomes stale and no longer valid for purposes of being relied upon by the distributed content delivery service 402.

The centralized content delivery service 401 redirects the principal 410 to the distributed content delivery service 402 once the principal 410 is authenticated and once the access statements are generated from the principal 410 to access the desired content being requested by the principal 410. In some cases, this is achieved via WWW browser redirection. Moreover, the access statement is included in the redirected request, such that the distributed content delivery service 402 may compare the version included in the request against a version that is independently acquired via the repository 403.

The interaction and processing associated with the principal 410 and the distributed content delivery service 402 were described in detail above with respect to the method 200 of the FIG. 2. The distributed content delivery service 402 receives requests for content from the principals 410 after the principals 410 have initially interacted with the centralized content delivery service 401. In some cases, the principals 410 may still be considered properly authenticated, such that the distributed content delivery service 402 can rely on that authentication without performing additional authentication on the principals 410. In other cases, policy may dictate that the distributed content delivery service 402 perform its own independent authentication of the principals 410.

Once the principals 410 are determined to be authenticated, the distributed content delivery service 402 inspects the request to acquire a version of the access statement. In some cases, that version may be a SAML or Liberty Alliance Group assertion provided by the centralized content delivery service 401 within the redirected principal request, which the distributed content delivery service 402 relies upon to independently determine access to the desired content may proceed unabated. In other cases, the version of the access statement is not an assertion but rather an identifier for a specific piece of content. In these latter cases, the distributed content delivery service 402 queries the repository 403 using an identifier for a requesting principal 410 or an identity associated with the requesting principal 410 to acquire one or more access statements written to the repository 403 previously by the centralized content delivery service 401. A comparison is then made and if a match occurs, the distributed content delivery service 402 satisfies itself that access to the content is appropriate.

Once the distributed content delivery service 402 independently verifies the access statement and the principal 410 for access to the desired content, the content is vended or streamed to the principal 410 according to policy.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer implemented method comprising:
   authenticating a principal;
   in response to a search of available content, presenting to the principal, via a user interface, a list of content available to the principal in response to a policy associated with the principal, wherein the list of available content searched comprises content accessible by the principal and content not accessible by the principal, and the list of content available represents an answer set of the search comprising only content accessible by the principal in accordance with one or more access statements;
   receiving, from the principal, a selection from the list of content available to the principal for one or more portions of the available content; and
   storing the one or more access statements in a repository that is accessible by a plurality of content services, such that the one or more access statements are accessible to each of the plurality of content services, wherein the one or more access statements provide an indication that the principal is permitted to access the selection; and
   instructing the principal to contact one of the plurality of content services to access the selection, wherein the instructing includes redirecting the user interface associated with the principal to the content service and providing assertion information to the one of the content services that the principal has been properly authenticated to an identity service, wherein when contacted by the principal, the one of the plurality of content services locates the one or more access statements via the repository before vending one or more portions of the selected content to the principal.

2. The computer implemented method of claim 1, wherein authenticating further includes enlisting an identity service to interact with the principal for purposes of authenticating the principal for access and vending the one or more portions of selected content includes streaming the one or more portions of selected content to the principal.

3. The computer implemented method of claim 1, wherein instructing the principal further includes redirecting a browser interface associated with the principal to the content service and providing an assertion within that redirection of the content service informing the content service that the principal has been properly authenticated to an identity service.

4. The computer implemented method of claim 3, wherein the one or more access statements are replicated to a plurality of repositories, additionally including comparing the assertion informing the content service that the principal has been properly authenticated with the one or more access statements located using a repository in the plurality of repositories to independently verify the access statement before vending the selection to the principal.

5. The computer implemented method of claim 1, wherein at least one of the one or more access statements including a digital certificate provided by third-party.

6. The computer implemented method of claim 1, wherein receiving a selection for one or more portions of the content includes interacting with the principal to satisfy access restrictions associated with the selection for purpose of acquiring consent to the access restrictions from the principal.

7. A system comprising:
   a first set of one or more server devices to provide a centralized content delivery service;
   a second set of one or more server devices to provide a distributed content delivery service, wherein the centralized content delivery service is to authenticate a principal for access to content controlled by the distributed content delivery service and the centralized content delivery service is to generate an access statement, to search for content that is available to the authenticated principal in accordance with the access statement, wherein the content searched comprises content accessible by the principal and content not accessible by the principal, and the list of content available to the principal represents an answer to the search comprising only content accessible by the principal in accordance with the access statement, and to receive a selection from the list of content available to the principal, presented in response to the search, to redirect a user interface to the distributed content delivery service, the access statement subsequently used by the distributed content delivery service to determine whether the principal is to be vended or streamed the content; and
   a repository to record the access statement generated by the centralized content delivery service, the repository accessible by both the centralized content delivery service and the distributed content delivery service, the repository to be read by the distributed content delivery service to subsequently acquire the access statement and the access statement is to be communicated from the centralized content delivery service to the distributed content delivery service via the repository.

8. The system of claim 7, wherein the access statement is one of a Uniform Resource Identifier, a Uniform Resource Locator, or a digital certificate provided by a third party.

9. The system of claim 7, wherein the access statement is additionally communicated from the centralized content delivery service to the distributed content delivery service via a redirected request forced to a browser of the principal by the centralized content delivery service and redirected to the distributed content delivery service.

10. The system of claim 9, wherein the access statement is an assertion from the centralized content delivery service that the principal is authorized to access the content and the assertion is to be relied upon by the distributed content delivery service.

11. The system of claim 7, wherein the centralized content delivery service is implemented as a transparent proxy associated with the principal or as a reverse proxy associated with the distributed content delivery service.

12. The system of claim 7, wherein the centralized content delivery service and the distributed content delivery service enforce one or more policies associated with the principal or the content before the access statement is generated, before the content is vended or streamed, or while the content is streamed.

13. A networked content delivery system, comprising:
one or more networked server devices to provide a centralized content delivery service to authenticate a principal for access to content, to search for content that is available to the authenticated principal in response to a policy associated with the principal, wherein the content searched comprises content that is accessible by the principal and content not accessible by the principal, to present, to a user interface, a list of content available to the authenticated principal that represents an answer to the search comprising only content accessible by the principal in accordance with an access statement, and to receive a selection from the list of content available the principal presented in response to the search, to determine whether the principal is to be vended the content, to generate the access statement that indicates that the principal is to be vended the content; and
a distributed storage system to store an electronic data repository to record the access statement, the user interface redirected from the centralized content delivery service to the distributed storage system to access the selection by the principal, and to replicate the access statement to a plurality of directories in the distributed storage that represents the electronic data repository accessible by the one or more networked server devices, the access statement an assertion from the centralized content delivery service that the principal is authorized to access the content from the distributed storage system, wherein the content is to be vended or streamed to the principal after the access statement is verified.

14. The networked content delivery system of claim 13, wherein the centralized content delivery service is implemented as a transparent proxy associated with the principal and authenticates the principal to access to the content via an identity service.

15. The networked content delivery system of claim 14, wherein the identity service is to provide a single sign-on service for a single sign-on identity and store a set of temporary identities and credentials which facilitate access to content for the single sign-on identity.

16. The networked content delivery system of claim 15, wherein the centralized content delivery service is to authenticate the principal based on a temporary identity provided by the identity service.

17. The networked content delivery system of claim 13, additionally including one or more server devices to execute a distributed content delivery service to acquire the access statement from the electronic data repository and independently verify the access statement to determine whether the principal is to be vended or streamed the content.

18. The networked content delivery system of claim 17, wherein the distributed content delivery service is to stream content to the principal after the access statement is independently verified.

19. The networked content delivery system of claim 18, wherein the distributed content delivery service is to stream content to the principal according to a policy associated with the principal.

20. The networked content delivery system of claim 19, wherein the policy associated with the principal includes to restrict bandwidth while the content is streamed to the principal or to limit features that are enabled within the content.

21. The networked content delivery system of claim 13, wherein the access statement is one of a Uniform Resource Identifier, a Uniform Resource Locator, or a digital certificate provided by a third party.

22. A networked content delivery system, comprising:
a distributed storage system to store an electronic data repository to record an access statement, and to replicate the access statement to a plurality of directories in the distributed storage that represent the electronic data repository, wherein the access statement is an assertion that a principal is authorized to access content; and
one or more server devices to execute a distributed content delivery service to acquire the access statement from one of the plurality of directories in the distributed storage that represent the electronic data repository and independently verify the access statement to determine whether the principal is to be vended or streamed the content, to present the user, via a user interface, with a list of content available to the authenticated user in response to a search of available content and in response to a policy associated with the principal, the content searched comprising content accessible by the principal and content not accessible by the principal, wherein the list of content available represents an answer to the search comprising only content accessible by the principal in accordance with the access statement, and to receive a selection, by the principal using the user interface, from the presented list of content available to the principal presented, wherein the user interface is redirected from the distributed content delivery service to the distributed storage system to access the selection by the principal.

23. The networked content delivery system as in claim 22, additionally comprising one or more networked server devices to provide a centralized content delivery service to authenticate a principal for access to content, to determine whether the principal is to be vended or streamed the content, and to generate the access statement that indicates that the principal is to be vended or streamed the content.

24. The networked content delivery system as in claim 23, wherein the centralized content delivery service is implemented as a reverse proxy associated with the distributed content delivery service.

25. The networked content delivery system of claim 24, wherein the access statement is one of a Uniform Resource Identifier, a Uniform Resource Locator, or a digital certificate provided by a third party.

26. The networked content delivery system of claim 22, wherein the distributed content delivery service is to stream content to the principal according to a policy associated with the principal, the policy including to restrict bandwidth while the content is streamed to the principal.

27. The networked content delivery system of claim 22, wherein the distributed content delivery service is to stream content to the principal after the access statement is independently verified.

28. A non-transitory machine-readable storage medium storing instructions which, when executed by one or more processors, cause the one or more processors to perform operations comprising:
authenticating a principal;
in response to a search of available content, presenting to the principal, via a user interface associated with the principal, a list of content that is available to the principal in response to a policy associated with the principal, wherein the list of available content searched comprises content accessible by the principal and content not accessible by the principal, and the list of content available represents an answer set of the search comprising only content accessible by the principal in accordance with one or more access statements;

receiving, from the principal, a selection from the answer set of the search for one or more portions of the content available to the principal; and storing the one or more access statements in a repository accessible by a plurality of content services, such that the one or more access statements are accessible to each of the plurality of content services, wherein the one or more access statements provide an indication that the principal is permitted to access the selection; and instructing the principal to contact one of the plurality of content services to access the selection, the instructing includes redirecting the user interface associated with the principal to the content service and providing assertion informing the one of the content services that the principal has been properly authenticated to an identity service, wherein when contacted by the principal, the one of the plurality of content services uses the repository to locate the one or more access statements before vending or streaming the selection to the principal.

29. The non-transitory machine-readable storage medium as in claim 28, wherein the one or more access statements are one of a Uniform Resource Identifier, a Uniform Resource Locator, or a digital certificate provided by a third-party.

30. A non-transitory machine-readable medium storing instructions which, when executed by one or more processors, cause the one or more processors to perform operations comprising:

authenticating a principal;

in response to a search of available content, presenting to the principal, via a user interface, a list of content available to the principal in response to a policy associated with the principal, wherein the list of available content searched comprises content accessible by the principal and content not accessible by the principal, and the list of content available represents an answer set of the search comprising only content accessible by the principal in accordance with one or more access statements;

receiving, from the principal, a selection from the list of content available to the principal for one or more portions of the content available to the principal;

storing the one or more access statements in a repository accessible by a plurality of content services such that the one or more access statements are accessible to each of the plurality of content services, wherein the one or more access statements provide an indication that the principal is permitted to access the selection; and instructing the principal to contact one of the plurality of content services to access the selection, wherein the instructing includes redirecting the user interface associated with the principal to the content service and providing assertion information to the one of the content services that the principal has been properly authenticated to an identity service, wherein when contacted by the principal, the one of the plurality of content services locates the one or more access statements via the repository before vending one or more portions of selected content to the principal.

31. The non-transitory machine-readable medium as in claim 30, wherein vending the one or more portions of selected content includes streaming the one or more portions of selected content to the principal.

32. The non-transitory machine-readable medium as in claim 31, wherein the one or more access statements are one of a Uniform Resource Identifier, a Uniform Resource Locator, or a digital certificate provided by a third-party.

* * * * *